United States Patent [19]

Koeplin-Gall et al.

[11] Patent Number: 4,643,835

[45] Date of Patent: Feb. 17, 1987

[54] ASIATIC CLAM CONTROL CHEMICAL

[75] Inventors: Sandra Koeplin-Gall; Ronald H. Schild, both of Naperville, Ill.

[73] Assignee: Nalco Chemical Company, Oak Brook, Ill.

[21] Appl. No.: 770,124

[22] Filed: Aug. 28, 1985

[51] Int. Cl.$^4$ .............................................. C02F 1/50
[52] U.S. Cl. .................................... 210/754; 210/764
[58] Field of Search ............................... 210/753–755, 210/764, 765

[56] References Cited

U.S. PATENT DOCUMENTS 3,975,271  8/1976  Saunier et al. .................. 210/753 X
4,119,535 10/1978  White et al. ........................ 210/755
4,411,799 10/1983  Ito et al. .......................... 210/764 X
4,561,983 12/1985  Davis et al. ........................ 210/755

OTHER PUBLICATIONS

Goss et al, "Control Studies on *Corbicula* for Steam-Electric Generating Plants", Proceedings, First International Corbicula Symposium, Texas Christian University, Fort Worth, Texas, Oct. 13–15, 1977, pp. 139–151.

*Primary Examiner*—Tom Wyse
*Attorney, Agent, or Firm*—John G. Premo; Donald G. Epple

[57] ABSTRACT

Asiatic clams can be controlled by treating the waters in which they grow with a composition comprising the combination of a chlorine solution and a bromide salt capable of releasing bromide ions to the chloride solution.

2 Claims, No Drawings

ASIATIC CLAM CONTROL CHEMICAL

INTRODUCTION

This invention is a chemical program which controls the Asiatic clam (*Corbicula fluminea*) better than chlorination. Chlorination is currently the most commonly recommended program for the control of the Asiatic clam.

The chemical program consists of:
(1) a chemical which is a bromide salt, with or without a surfactant plus a chlorine source;
(2) a feed system which is capable of combining the bromide salt solution with concentrated chlorine, either gas or liquid.

Asiatic clams foul water systems in at least 28 states. In many cases, the cooling system is once-through with the water discharging directly back into a river or lake. Any treatment program added to control the clam population must not be toxic enough to kill the fish population in the receiving stream. For this reason, the most commonly used technology for clam control is continuous, low level chlorination around spawning season.

The primary advantage of this invention is that this macrofouling control program offers a significant reduction in the amount of time required to kill this Asiatic clam. The use of this macrofouling control program will kill clams 4 times faster than chlorine alone. This is particularly important when there is a time limit issued by a regulatory body which limits chlorination practice. It is also important in situations like once-through units which are exposed to the chemical program for a shorter duration than recirculating system.

THE INVENTION

The present invention provides a method for controlling Asiatic clams which are present in waters which comprises treating these waters with a composition comprising a chlorine solution and a bromide salt capable of releasing bromide ions to the chlorine solution. The dosage of the composition required to effectively control the Asiatic clams may be as little as 0.05 up to as much as 5–10 mg/L based on the weight of the water containing the clams.

Suitable bromide salts include the alkali and alkaline earth metal bromides but are not limited thereto. For instance, magnesium bromide, calcium bromide, sodium bromide, potassium bromide, ammonium bromide, and the like salts can be used, either singly or as mixture of two or more as desired.

A bromide salt, for example, sodium bromide, when introduced into a chlorine solution in which the chlorine is presently mostly as hypochlorous acid, has been shown to at least partially displace chlorine, resulting in the formation of the active biocide, hypobromous acid, and innoxious sodium chloride by-product as follows:

$$NaBr + HOCl \rightarrow NaCl + HOBr$$

In present chlorination installations, the bromide salt can merely be introduced downstream of the chlorine educting water line, at which point gaseous chlorine has already been introduced into a water stream and hydrolized to form the hypochlorous acid and hydrochloric acid, which usually would be an acidic chlorine solution. It can also be introduced into sodium hypochlorite solutions and will undergo the same reactions.

The bromide salts are themselves generally innoxious salts and thus their use in combination with chlorine presents no new or unknown hazards and makes use of the same chlorine introduction facilities that are now in use.

Such chlorine solutions can be prepared by the dissolution of gaseous chlorine in water, forming through hydrolysis hypochlorous acid and hydrochloric acid. chlorine solutions of sodium hypochlorite will also work. By the term, "aqueous chlorine solution," as used herein, is meant solutions equivalent to that derived from dissolution of chlorine in water or acidic solutions containing chlorine as the hypochlorous acid or solutions of sodium or calcium hypochlorite.

One feature of the combination forming the composition of the present invention is the formation of hypobromous acid by the displacement of at least some chlorine of the hypochlorous acid with bromine derived from the bromide salt, forming a generally innoxious chloride salt by-product. Thus the composition is a combination which includes at least some hypobromous acid and is thus more effective in typical water systems at least due to the greater activity of bromamines over chloramines that are formed when ammonia is present in the system. The composition of the present invention results in effluent discharges of lower toxicity due at least to the greater instability of bromine residuals.

The degree of conversion of hypochlorous acid to hypobromous acid depends of course to an extent on the relative proportion of bromide salt to hypochlorous acid which are combined to form the composition and other factors affecting the displacement of chlorine with bromine. The present invention encompasses not only a complete or near complete displacement of bromine for the chlorine in the hypochlorous acid, providing essentially a bromination system, but displacement far short of this.

The composition used in the present invention is particularly suited for any water system already set up with a chlorination purification system and thus already equipped with appropriate apparatus for metering and introducing chlorine to the water system, but is, of course, not limited thereto. As mentioned above, many chlorination systems derive chlorine from pressurized cylinders, as gaseous chlorine, and meter the chlorine as a gas. In such systems it is extremely advantageous to retain the same equipment and convert at least some of the hypochlorous acid to hypobromous acid by the introduction of the bromide salt downstream of the chlorine educting water line, preferably prior to the point at which the water stream enters the main water system.

The composition used in the present invention includes those wherein the chlorine solution is prepared other than from dissolution of gaseous chlorine, such as chlorine obtained from sodium or calcium hypochlorite solutions.

The preferred pH range for forming the composition of this invention is from about 2.0 to about 13.0. Sodium hypochlorite solutions may be at pH 13.0 or so. The above described compounds are added directly to this line and the reaction occurs and kills biological species.

The species can be formed at pH values from 2–13. After the formation, the composition will be introduced into water systems wherein the overall pH is not within these ranges and may well not even be acidic.

Although the present invention encompasses any proportion of bromide salt to chlorine, in preferred embodiment, the present invention includes the combination of bromide salt to chlorine as the hypochlorous acid in the proportion of about 0.25 to about 1.5 equivalents and, more preferably, about 0.5 to about 1.0 equivalents (chemical equivalent weight basis).

In a preferred embodiment of the invention, the chlorine and bromine containing compositions are rendered more effective by the inclusion therewith of surface active agents which may, for purposes of convenience, be referred to as "biodispersants." When these materials are used, the amount present in the composition ranges between about 1 up to about 10% by weight.

The biodispersants are preferably chosen from the group consisting of ethylene oxide condensates with propylene oxide adducts or propylene glycol having an HLB between 4–10 and a molecular weight between 1000–5000, nonionic polyethoxylated straight chain alcohols, tris cyanoethylated cocodiamines, polyoxyethylene sorbitan ester/acids, nonionic N,N, dimethyl stearamides, nonionic amine polyglycol condensates, and nonionic ethoxylated alcohols. Table I shows the types of chemicals which have been demonstrated to have biodispersant properties.

TABLE I

Evaluation of Compounds for Biodispersancy
10 ppm with 1 hour contact
Data Collected with Biometer

| Dispersant Chemical Type | % Biomass Change |
|---|---|
| nonionic (polyol) condensate of ethylene oxide with hydrophobic bases (propylene oxide with propylene gylcol) | 66.4% |
| nonionic polyethoxylated straight chain alcohol | 58.5% |
| tris cyanoethyl cocodiamine | 47.3% |
| polyoxyethylene sorbitan ester of fatty and resin acids and alkyl aryl sulfonate blend (nonionic) | 45.8% |
| cationic ethylene oxide condensation products of Duomeen T* | 35.8% |
| nonionic N,N—dimethyl stearamide | 34.7% |
| monoamine (cationic) (cocomononitrile) | 31.3 |
| low MW polyacrylate (MW 1000–10,000) | 31.1% |
| nonionic amine polyglycol condensate | 30.0% |
| cationic - cocodiamine | 25.6% |
| nonionic ethoxylated alcohol | 21.2% |

*Duomeen T = tallow-trimethylene diamine

The % biomass change in Table I was meaured by exposing a slime mass previously grown and attached onto a surface to clear recirculating water at about 100° F. The water contained 10 ppm of each of the indicated biodispersants and it was allowed to recirculate at temperature for one hour. At the end of that time period, a biomass assay was made of water collected in a common basin by using a duPont 760 Luminescence Biometer which is described in the publication, duPont 760 Luminescence Biometer, published in December, 1970, and described in U.S. Pat. No. 3,359,973, which is incorporated herein by reference.

This Table shows the percent of clumped biomass dispersed by treatment with 10 ppm of the indicated dispersant. Although other dispersants were tested which had lower than 20% effectiveness; this data is not presented since any dispersant having less than 20% effectiveness in these tests would be found not to function adequately in this invention.

While we have referred to these materials as biodispersants, their function is to improve the penetration of compositions used in this invention into the intercies of the clam thereby making the compositions more effective in killing these biological species.

EVALUATION OF THE INVENTION

In the following test methods, the source of bromine was derived from a composition hereafter referred to as Comp. A.

| Comp. A | |
|---|---|
| Ingredients | % by Weight |
| Soft Water | 3.9 |
| Water-soluble octyl phenol reacted with ethylene oxide in an amount sufficient to provide a biodispersant | 1.0 |
| Sodium bromide (45% solution) | 95.1 |

MATERIALS AND METHODS

Asiatic clams (juveniles and adults) were collected from a river in early January 1985 and allowed to acclimate in the laboratory in artificial stream systems for two weeks. Clams were fed daily with a stock culture of Chlamydomonas. Laboratory temperature was increased in 2°–3° C. increments every other day until the test temperature (18° C.) was reached.

The artificial stream system used consisted of seven streams, four of which were used in this study. A rotating paddle wheel maintained currents in the streams while constant temperatures were provided by small aquaria heaters in each stream. Fresh diluent water was not added to the streams during chlorine exposures to minimize surges in chlorine demand from allochthonous sources. Adequate turnover of the streams was provided by the flow rate of the incoming toxicant solutions (approximately one turnover/day). Stock solutions of chlorine (calcium hypochlorite) and chlorine/bromine (calcium hypochlorite/Comp. A) were prepared every 2 days in 20-L carboys, and positioned above the streams on stir plates to keep the test solutions thoroughly mixed. The solutions were continuously pumped into the streams by means of Cole-Parmer peristaltic pumps.

Test target doses for individual streams were:
(1) 0.65 mg/L total residual chlorine (TRC);
(2) 0.65 mg/L total residual oxidant (TRO) consisting of TRC and Comp. A at a 4:1 ratio; and
(3) 0.65 mg/L with TRAC and Comp. A at a 1:1 ratio.

The fourth stream consisted of control or reference clams held in dechlorinated, municipal tap water. Each of the four streams were provided with three sets of fiber glass cages each containing 10 juveniles (5–8 mm shell length) and 10 adults (13–18 mm shell length). The TRC and TRO target concentrations were checked twice daily along with a single daily pH and temperature. Daily TRC and TRO in the streams was measured using a Wallace-Tiernan amperometric titrator. The presence of bromine was verified at the time of stock solution preparation by a colorometric approach accomplished by use of a field kit. Samples of water chemistry were shipped weekly for analysis. Parameters measured included anions (fluoride, chloride, sulfate, nitrate, nitrite, bicarbonate alkalinity, boron, phosphorous, and silica) and cations (calcium, magnesium, potassium, chromium, copper, iron, strontium, zinc, lead and ammonia). Other parameters analyzed included pH, alkalinity, conductivity, turbidity and aluminum. Elements analyzed that were <0.1 mg/L included barium, molybdenum, nickel, antimony, tin, thallium, cadmium, cobalt, manganese, titanium, vanadium, and zirconium.

The results are set forth in Table II. These tests included: (1) establish that total residual chlorine (TRC) concentrations for which adult Asiatic clams are controlled after a 28-day exposure, and (2) establish the toxicity of chlorine with Comp. A at 1:1 and 4:1 ratio versus chlorine alone.

TABLE II

Number and percent mortalities of juvenile and adult Asiatic claims (*Corbicula fluminea*) exposed to 0.65 mg/L TRC and 0.65 mg/L TRC that consisted of TRC - Comp. A in 4:1 and 1:1 ratios during 26 days of exposure in laboratory artificial streams.

| | | Number and Percent Mortality | | | | | |
|---|---|---|---|---|---|---|---|
| | | 0 | 7 | 14 | 21 | 24 | 26 |
| TRC ONLY | | | | | | | |
| Adults | # | 0 | 5/30 | 16/30 | 27/30 | 30/30 | |
| | % | 0 | 16.7 | 53.3 | 90.9 | 100 | |
| Juveniles | # | 0 | 10/30 | 25/30 | 30/30 | | |
| | % | 0 | 33.3 | 83.3 | 100 | | |
| TRC - Comp. A (4:1) | | | | | | | |
| Adults | # | 0 | 15/30 | 18/30 | 26/30 | 27/30 | 30/30 |
| | % | 0 | 50.0 | 60.0 | 86.7 | 90.0 | 100 |
| Juveniles | # | 0 | 12/30 | 26/30 | 30/30 | | |
| | % | 0 | 40.0 | 86.7 | 100 | | |
| TRC - Comp. A (1:1) | | | | | | | |
| Adults | # | 0 | 21/30 | 25/30 | 28/30 | 30/30 | |
| | % | 0 | 70.0 | 83.3 | 93.3 | 100 | |
| Juveniles | # | 0 | 11/30 | 22/30 | 30/30 | | |
| | % | 0 | 36.7 | 73.3 | 100 | | |

Having thus described our invention, it is claimed as follows:

1. A method for controlling Asiatic clams which are present in waters which comprises treating these waters with a composition comprising the combination of chlorine solution and a bromide salt capable of releasing bromide ions to the chlorine solution, and from about 1 up to about 10 percent by weight of a water-soluble biodispersant chosen from the group consisting of ethylene oxide condensates with propylene oxide adducts or propylene glycol having an HLB between 4–10 and a molecular weight between 1,000–5,000, nonionic polyethoxylated straight chain alcohols, tris cyanoethylated cocodiamines, polyoxyethylene sorbitan ester/acids, nonionic N,N, dimethyl stearamides, nonionic amine polyglycol condensates, and nonionic ethoxylated alcohols, and mixtures thereof.

2. The method of claim 1 where the proportion of bromide salt to chlorine, as hypochlorous acid, is from about 0.25 to about 1.5 equivalents.

* * * * *